April 26, 1927.  1,626,129

H. AUSTIN

WINDOW FOR MOTOR VEHICLES

Filed April 12, 1926   2 Sheets-Sheet 1

Herbert Austin
By J. H. Clarkson

April 26, 1927.  H. AUSTIN  1,626,129
WINDOW FOR MOTOR VEHICLES
Filed April 12, 1926    2 Sheets-Sheet 2

Inventor:
Herbert Austin
By J. Clarkson

Patented Apr. 26, 1927.

1,626,129

UNITED STATES PATENT OFFICE.

HERBERT AUSTIN, OF BROMSGROVE, ENGLAND.

WINDOW FOR MOTOR VEHICLES.

Application filed April 12, 1926, Serial No. 101,529, and in Great Britain April 29, 1925.

This invention relates to a window or side screen of the type which is hinged at or near one bottom corner to a door or other part of a vehicle body and folds down about such hinge in a plane parallel to the door or other part, and has for its object to effect certain improvements therein.

According to this invention, the window or screen frame is divided into two parts which are hinged together by a vertical hinge axis. To close down the frame the one part is folded over the other and then the whole turned down into a recess in the door or body or against the inner face thereof.

According to a preferred arrangement the one part frame has its glass or other light in a different plane from the other and is provided with guides to receive the light of the other part after which the empty frame of the other part is folded over it. The light of such other part may normally extend over the vertical hinge axis and so keep the window rigid.

In order that the invention may be clearly understood convenient practical applications thereof are described by reference to the drawings, of which—

Figure 1:
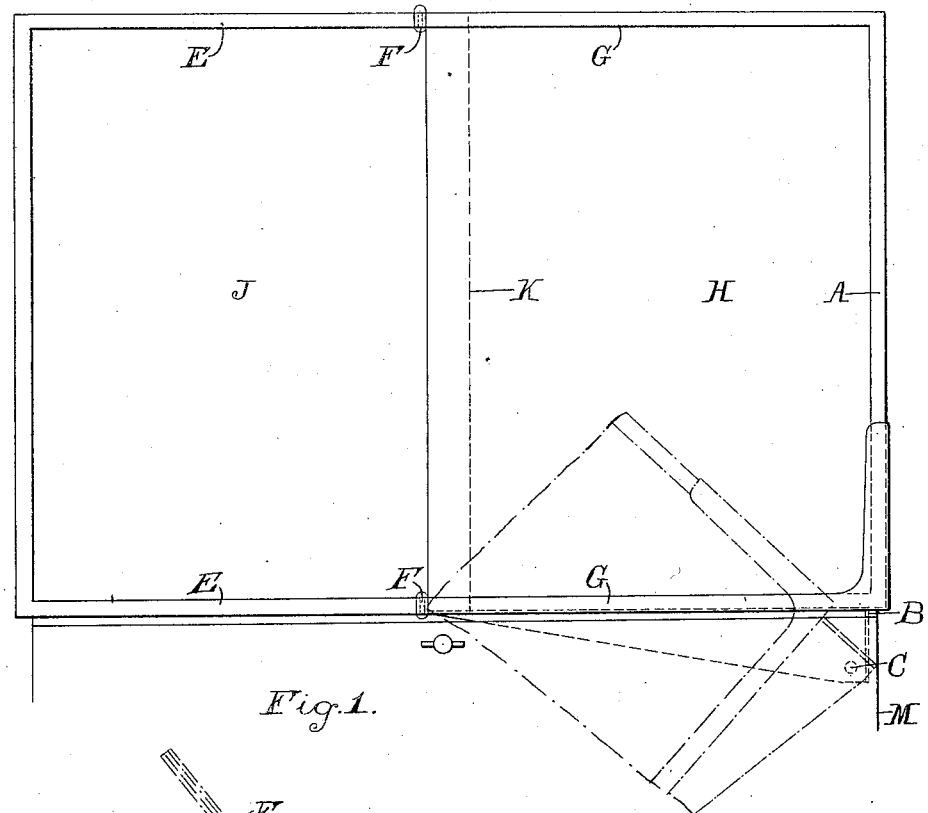
Figure 1 is an inner side view of the top of a vehicle door having fitted thereto a window arranged according to the invention and showing the window as set up. The window is also shown by broken lines in this figure as partly folded down.
Figure 2:
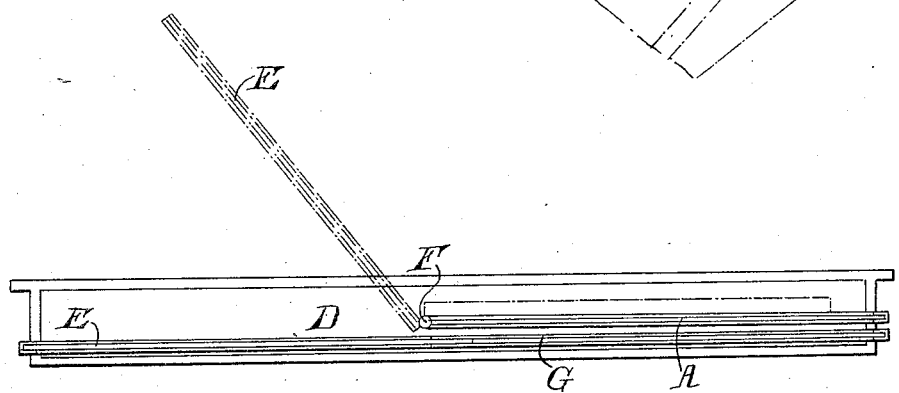
Figure 2 is a plan view of the door and window and also indicates by broken lines the hinged part of the frame as turned through an angle in folding it up.
Figure 3:
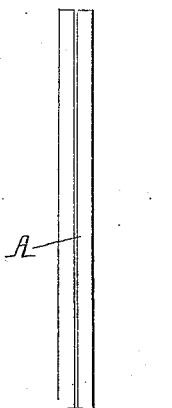
Figure 3 is a vertical sectional view of the door top and window shown in Figure 1.

Referring first to Figures 1 to 4, A is the frame of the main light provided with a downward bracket B hinged at C in a recess D of the door. The frame A is provided with a frame E hinged at the top and bottom at F F and with a pair of guides G G which, when the window is fully set up as shown by full lines in Figure 1, are in line with the frame E. The main light H is fixed in the frame A and an auxiliary light J is adapted to slide in guides of the frame E and in the guides G G. The width of the light J is such that it overlaps the light H, as indicated by the dotted line K, when the window is set up, so that it maintains the frame E rigid with the frame A.

To close down the window the light J is slid back until it lies over the light H when the frame E is free to be hinged outwards of the vehicle and be folded against the outer face of the light H. The window is then free to be folded down into the recess in the door.

It will be seen by reference to Figure 1 that the right hand edge of the light H overhangs the edge M of the door somewhat so that it may take the place of a pillar or the auxiliary small screen often provided to fill up the space. Also it will be seen (by reference more especially to Figure 4) that the bottom edge of the window when set up is slightly above the top edge of the door and a flap N preferably of rubber may be provided adapted to pass close under the window when set up. The flap N is mounted upon a flap P hinged at Q which may be folded back to withdraw the flap while lowering the window. T is a wing screw carried by the flap P and adapted to screw into a boss V fixed to the door top to keep the flap closed.

Figure 5:
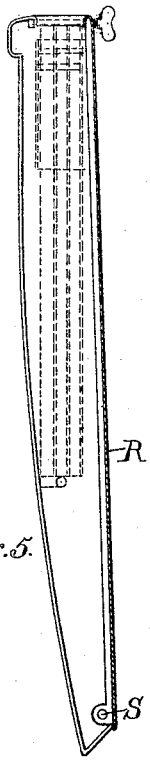
Figure 5 is a vertical sectional view of a modified form of the invention showing the window folded down.
Figure 4:
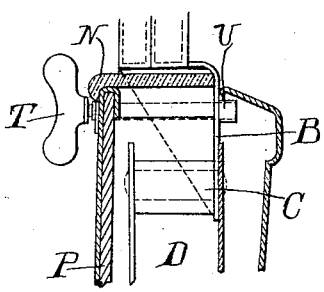
Figure 4 is an enlarged view of the upper part of the door in section.

The construction shown in Figure 5 is very similar but in this case the flap P is replaced by a flap R which is hinged at S to the foot of the door and forms the inner wall of the recess in the door.

Having fully described my invention what I claim and desire to secure by Letters Patent is:—

1. A main transparent medium for use as a window or wind screen of a motor vehicle, a main frame in which said transparent medium is set, said frame being hinged at one bottom corner to a part of the vehicle and being adapted to fold down in a plane parallel to such part, guides on said main frame, a supplementary frame comprising guides and being hinged to said main frame by a vertical hinge axis, and a supplementary transparent medium sliding in said guides of said supplementary frame and adapted also to be slid into said guides of said main frame.

2. A main transparent medium for use as a window or wind screen of a motor vehicle, a main frame in which said transparent medium is set, said frame being hinged at one bottom corner to a part of the vehicle and being adapted to fold down in a plane parallel to such part, guides on said main frame, a supplementary frame narrower than said main frame, said supplementary frame comprising guides and being hinged to said main frame by a vertical hinge axis and a supplementary transparent medium of a width greater than said supplementary frame whereby it may lie over the vertical hinge axis joining the supplementary frame to the main frame, said supplementary medium being slidable in the guides of said supplementary frame, and being adapted also to be slid into said guides of said main frame.

In witness whereof I have hereunto signed my name this 26th day of March, 1926.

HERBERT AUSTIN.